United States Patent Office 3,325,757
Patented June 13, 1967

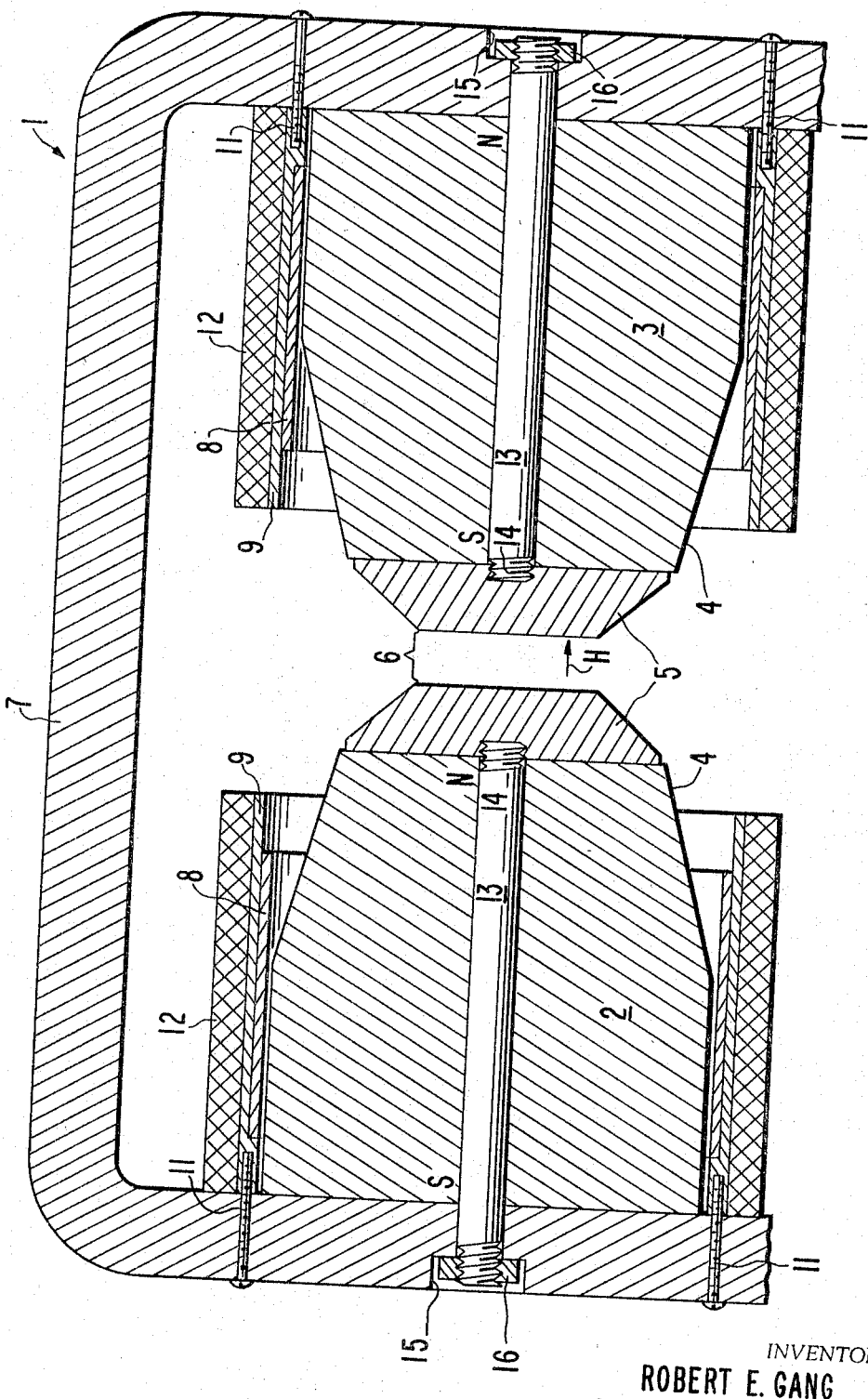

3,325,757
NEGATIVE TEMPERATURE COEFFICIENT MEANS FOR A MAGNET STRUCTURE
Robert E. Gang, Sunnyvale, Calif., assignor to Varian Associates, Palo Alto, Calif., a corporation of California
Filed Dec. 8, 1965, Ser. No. 512,422
9 Claims. (Cl. 335—217)

The present invention relates in general to temperature compensated permanent magnetic circuits and more particularly to such circuits which includes a pair of permanent magnets, axially spaced apart to define a magnetic gap, polarized in aiding relation, and enclosed by a magnetic permeable shielding yoke. Such magnetic circuits are especially useful, for example, for providing the intense uniform polarizing magnetic field for gyromagnetic resonance spectrometers.

Heretofore bowl type permanent magnet circuits for voltage tunable magnetrons have been temperature compensated by means of a sleeve of temperature compensating material disposed around the equator of the permanent bowl magents. Typically the temperature compensating material has been a certain type of Carpenter's steel having a negtaive temperature coefficient of magnetic permeability. The sleeve forms a temperature sensitve magnetic shunt which shunts less magnetic field as the magnet warms up thereby compensating for the loss of magnetization of the permanent magnet as it is heated in use. Such a prior temperature compensated magnetic circuit is shown in U.S. Patent 3,194,998 issued July 13, 1965.

Bowl magnet circuits have a substantial amount of leakage flux and consequently do not represent an optimum use of the magnetic material and thus are unduly heavy and bulky. Moreover, such flux leaky circuits create shielding problems if they are to be closely packed with other devices which may be magnetic or which are sensitive to stray flux.

A more practical magnetic circuit, for many applications, which overcomes many of the problems of the bowl circuit, is a magnetic circuit wherein a pair of spaced apart axially aligned permanent magnets are enclosed within a magnetic permeable yoke, as of soft iron, which returns the flux between the outer ends of the pair of permanent magnets. The enclosing yoke also serves as a magnetic shield for shielding the internal flux gap from extraneously produced magnetic fields. Hereinafter this latter type of magnetic circuit will be referred to as a self shielding magnetic circuit.

In the present invention, thermal compensation is provided for the self shielding magnetic circuit by providing thermally compensating shunt members shunting one or more of the internal magnets of the circuit. In a preferred embodiment of the present invention, the self shielding magnetic circuit for a gyromagnetic resonance spectrometer is thermally compensated by means of a thermal compensating sleeve surrounding each magnet or by means of a temperature compensating member located internally of one or more of the permanent magnets for shunting the magnets for shunting the magnets back on themselves.

The principal object of the present invention is the provision of an improved thermally compensated self shielding magnetic circuit especially useful for producing high intensity uniform fields.

One feature of the present invention is the provision of a high intensity, uniform, self shielding permanent magnet circuit having a thermal compensating shunt disposed to shunt at least one of the permanent magnets back on itself in a manner which is substantially independent of the yoke.

Another feature of the present invention is the same as the preceding wherein the temperature compensating shunt is a relatively thin sleeve of temperature compensating material surrounding at least one and preferably both of the magnets of the self shielding magnetic circuit whereby the magnetic circuit is temperature compensated without substantially perturbing the uniformity of the field in the gap.

Another feature of the present invention is the same as the first feature wherein the temperature compensating shunt is disposed internally of at least one and preferably both of the permanent magnets whereby the uniformity of the field in the gap is not substantially perturbed by the shunt.

Other features and advantages of the present invention will become more apparent upon a perusal of the following specification taken in connection with the accompanying drawing wherein:

The drawing shows a longitudinal sectional view of a self shielding high field gyromagnetic resonance spectrometer permanent magnet circuit employing temperature compensation features of the present invention.

Referring now to the drawing there is shown a self shielding permanent magnet circuit 1 especially useful for a gyromagnetic resonance spectrometer and employing the temperature compensation of the present invention. More particularly, the magnetic circuit comprises a pair of axially aligned spaced apart permanent magnets 2 and 3, having truncated cone-shaped end portions 4 as of alnico V-7.

The mutually opposed ends of the magnets 2 and 3 are capped by a pair of truncated cone-shaped magnetic permeable pole pieces 5 as of 1" thick soft iron which have exceptionally good uniformity and which pole caps have been polished to provide a high degree of parallelism between the mutually opposed faces thereof.

The magnets 2 and 3 are polarized in magnetic field aiding relationship to produce a unidirectional magnetic field intensity H of approximately 14,000 gauss in the gap 6 about ½" in axial length defined by the space between the mutually opposed faces of the pole caps 5. The field should be uniform on the order of 1 milligauss per centimeter in order to provide high resolution gyromagnetic resonance spectra.

A self shielding closed cylindrical yoke 7 as of soft iron 1¼" thick envelops the magnets 2 and 3 and provides a magnetic flux return path between the remote ends of the magnets 2 and 3. The enclosing soft iron yoke 7 also serves to shield the gap from magnetic disturbances and effects which are external to the yoke 7 and in addition keeps the field of the magnets 2 and 3 from extending out of the yoke to influence other nearby devices.

Thermal compensation for the magnetic circuit 1 is provided by means of a pair of relatively thin thermal compensating shunt sleeve members 8 having a negative magnetic premeability temperature coefficinet such as, for example, Carpenter's 30 type II alloy of 30% nickel and 70% iron which has a much larger coefficient than that of the magnet material. The compensating members 8 extend over approximately ⅔ of the length of the magnets 2 and 3 for shunting a fraction of the magnetic flux around the magnets 2 and 3 via the intermediary of the shunting members 8. The compensating members 8 are selected, dimensioned and arranged such that at the high temperature end of the operating range of temperatures to be compensated the amount of shunting action is at a minimum, preferably close to zero shunting effect. Then at the low end of the operating range of temperatures the shunting effect of the shunting members 8 is maximum and preferably equal to the gain in flux of the magnets obtained by the temperature drop. In this manner the magnetic field intensity in the gap 6 is maintained approximately constant over the operating temperature range.

The temperature compensation sleeves 8 are carried from the inside of a pair of nonmagnetic cylindrical coil forms 9 as a aluminum which are in turn carried at their ends from the yoke 7 via a plurality of screws 11. The sleeves 8 are positioned magnetically adjacent the magnets 2 and 3 in the sense that no substantial magnetic shielding is placed between the sleeves and the magnets 2 and 3. A pair of magnetization coils 12 are carried on the outside of the coil forms 9 for supplying, when energized with current, the initial magnetization to the permanent magnets 2 and 3. After the magnets 2 and 3 have been fully magnetized in place the coils 12 are no longer energized with a high D.C. current but may be used to modulate or sweep the D.C. field H by superimposing a small A.C. magnetic field in the gap produced by passing a relatively low intensity low frequency A.C. current through the magnetization coils 12.

In the magnetic circuit shown in the drawing, typical specifications for the magnet are as follows: The permanent alnico V–7 magnets 2 and 3 are 6.5" in length and 6.12" in maximum diameter. The yoke 7 is 1.25" in thickness with an outside diameter of approximately 14". The pole caps 5 are each 1" thick and tapered to provide a minimum diameter of 2.5" and spaced apart to define a 0.5" gap 6. The compensating sleeve 8 are 0.040" to 0.1" thick and 4" in length and extend over about ⅔ of the length of each magnet 2 and 3. The thermal compensating sleeves 8 may be bonded by a suitable adhesive directly to the magnets 2 and 3 or may be closely spaced apart from the magnet by, for example, a 0.125" thick cylindrical air gap and held to the coil form 9, as shown.

In operation, the compensating sleeves 8, above described, reduced the effective temperature coefficient of the magnets from 0.014%/° C. to 0.0019%/° C. for a sleeve 0.080" thick over a temperature range from 36.9° C. to 30.9° C. at a magnetic field intensity of 14,000 gauss in the gap 6. In addition, the shunting path for the flux lines as taken through the shunting sleeves 8 diverts the flux around the compensated magnet without the shunting flux path including any substantial portion of the yoke 7 communicating between the remote poles of the magnets 2 and 3. In this manner, the temperature compensator is rendered nonresponsive to magnetic changes in that portion of the yoke 7 communicating between the remote poles. Temperature compensation which is independent of the yoke is a special case of temperature compensation for self-shielding magnet circuits described and claimed in co-pending U.S. application No. 512,423 filed Dec. 8, 1965 and assigned to the same assignee as the present invention.

Another temperature compensation feature of the present invention is also shown in the drawing. More specifically, one or both, preferably both, of the magnets 2 and 3 are centrally bored to receive a pair of threaded rods 13 made of temperature compensating material, such as Carpenter's 30 type II alloy having a strong negative temperature coefficient of magnetic permeability. The rods 13 are threaded at their inner ends 14 into tapped bores in the center of the pole caps 5. The outer axial portions of the yoke 7 are axially bored and counterbored at 15 to receive a pair of nuts 16 which are threaded over the outer threaded ends of the rods 13. The nuts 16 are tightened down over the rods 13 to fixedly secure the magnets 2 and 3 and their pole pieces to the yoke 7.

The temperature compensating rods 13, internally disposed of the magnets 2 and 3, serve as temperature sensitive magnetic shunts for temperature compensation. As with the sleeves 8 the rods serve to shunt a decreasing fraction of the total magnetic flux produced by the magnets with increasing temperature, whereby the fall off in magnetic flux produced by the magnets 2 and 3 with increasing temperature is counteracted by less magnetic shunting effect of the magnetic shunts 13. In a magnet with dimensions and specifications as described above, the rods 13 would be approximately 1" in diameter. In case it was desired not to use the internal rod temperature compensation, the rods 13 could be reduced in diameter to ⅝" and made of nonmagnetic stainless steel.

As obtained with the sleeves 8, the rods 13 permit temperature compensation to be independent of changes in the magnetic properties of that portion of the enclosing yoke 7 communicating between the remote pair of magnetic poles of the magnets 2 and 3.

In preferred embodiments of the present invention, both the sleeves 8 and the rods 13 are symmetrically located relative to a plane passing through the center of the gap 6 normal to the aligned axes of the magnets 2 and 3. This symmetry reduces undesired magnetic gradients in the gap 6.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:
1. A temperature compensated magnet circuit including, means forming a pair of axially aligned and axially polarized permanent magnets characterized by having a loss of magnetization with increased temperature, said magnet pair means being polarized in magnetic field aiding relation and spaced apart to define a magnetic gap between a pair of near poles of opposite polarity and also defining a pair of remote poles of opposite polarity, means forming a magnetic permeable yoke substantially enclosing said pair of magnet means, shielding the gap from extraneous fields, and providing a flux return path communicating between said pair of remote poles, means forming a magnetic shunt located magnetically adjacent at least one of said magnets of said pair of magnet means for compensating said adjacent magnet, said shunt means being axially coextensive over a portion of the axial length of said compensated magnet, said magnetic shunt being disposed to shunt a decreasing fraction of the magnetic flux produced by said adjacent compensated magnet away from said gap with increasing temperature of said magnet, said shunt means further serving to shunt the fraction of magnetic flux back around the compensated magnet over a magnetic flux path which is substantially independent of that portion of said yoke means communicating between said pair of remote poles, whereby said temperature compensation is rendered non-responsive to magnetic changes in said yoke.

2. The apparatus according to claim 1 wherein said compensating shunt means comprises a relatively thin sleeve of negative temperature coefficient of magnetic permeability material coaxially disposed of and surrounding said compensated magnet.

3. The apparatus according to claim 2 wherein said sleeve has an axial length which is axially coextensive with said compensated magnet over a preponderance of the axial length of said compensated magnet.

4. The apparatus according to claim 3 wherein both magnets of said pair of magnets include similar temperature compensating shunt means substantially symmetrically positioned relative to a plane normal to the axes of said magnets passing through the center of said gap.

5. The apparatus according to claim 2 including a magnetization coil coaxially disposed of said compensated magnet and surrounding said compensating sleeve.

6. The apparatus according to claim 1 wherein said shunt compensating means includes a member having a negative temperature coefficient of magnetic permeability greater than said magnet material disposed internally of said compensated magnet.

7. The apparatus according to claim 6 wherein said compensating shunt member is a rod coaxially disposed of said magnet.

8. The apparatus according to claim 7 including a pair of magnetically permeable pole pieces disposed on the mutually opposed pair of near poles of said pair of magnets and defining the magnetic gap between a pair of spaced apart parallel faces of said pole pieces, and said rod serving to interconnect one of said pole pieces and a portion of said yoke for holding said pole piece and compensated magnet to said yoke.

9. The apparatus according to claim 8 wherein both magnets of said pair of magnets include similar temperature compensating rods substantially symmetrically positioned relative to a plane normal to the axes of said magnets passing through the center of said gap.

References Cited

UNITED STATES PATENTS 3,009,084  11/1961  Balliett _____ 335—217
3,126,518  3/1964   Johnannson.

BERNARD A. GILHEANY, *Primary Examiner.*

G. HARRIS, *Assistant Examiner.*